(12) United States Patent
Souda et al.

(10) Patent No.: US 8,142,099 B2
(45) Date of Patent: Mar. 27, 2012

(54) AUTOMATIC TRANSMISSION

(75) Inventors: Toru Souda, Okazaki (JP); Akihito Hongoya, Okazaki (JP); Satoru Kasuya, Hozu (JP); Takahiro Torii, Hekinan (JP); Tsuyoshi Yamaguchi, Anjo (JP); Takayuki Kawakami, Toyota (JP); Yoshiharu Harada, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 382 days.

(21) Appl. No.: 12/318,224

(22) Filed: Dec. 23, 2008

(65) Prior Publication Data
US 2009/0170616 A1 Jul. 2, 2009

(30) Foreign Application Priority Data
Dec. 26, 2007 (JP) ................................. 2007-334917
Sep. 9, 2008 (JP) ................................. 2008-230881

(51) Int. Cl.
*B25G 3/28* (2006.01)
(52) U.S. Cl. ..................... 403/359.1; 464/162
(58) Field of Classification Search ............... 403/359.1, 403/359.2, 359.6
See application file for complete search history.

(56) References Cited

U.S. PATENT DOCUMENTS

| 4,552,544 | A | * | 11/1985 | Beckman et al. ............. 464/162 |
| 5,935,041 | A | | 8/1999 | Tsukamoto et al. |
| 6,135,912 | A | * | 10/2000 | Tsukamoto et al. .......... 475/271 |
| 6,348,002 | B1 | * | 2/2002 | Breese .......................... 464/182 |
| 6,542,804 | B2 | * | 4/2003 | Muratomi ....................... 701/62 |
| 7,074,129 | B2 | * | 7/2006 | Sugiyama et al. ............. 464/182 |
| 7,972,078 | B2 | * | 7/2011 | Igarashi et al. ............ 403/359.6 |
| 2007/0104535 | A1 | * | 5/2007 | Valovick ................... 403/359.1 |

FOREIGN PATENT DOCUMENTS

| JP | U-61-77465 | 5/1986 |
| JP | U-2-146211 | 12/1990 |
| JP | A-3-66518 | 3/1991 |
| JP | A-4-175561 | 6/1992 |
| JP | U-5-57449 | 7/1993 |
| JP | A-10-122344 | 5/1998 |
| JP | A-2002-161950 | 6/2002 |
| JP | A-2008-008331 | 1/2008 |

\* cited by examiner

*Primary Examiner* — Justin Holmes
(74) *Attorney, Agent, or Firm* — Oliff & Berridge, PLC

(57) ABSTRACT

An automatic transmission that includes an input shaft; an output shaft; and a speed change mechanism portion that shifts a rotation of the input shaft to be transmitted to the output shaft, wherein: the output shaft has a spline formed in a range in which the output shaft fits in a power transmission shaft included in a vehicle, and n-stage (n is an integer of at least 2) chamfering is performed on a larger diameter portion of the spline.

21 Claims, 10 Drawing Sheets

(FORWARD DIRECTION)

AUTOMATIC TRANSMISSION

CROSS-REFERENCE TO RELATED APPLICATION

The disclosure of Japanese Patent Application No. 2007-334917 filed on Dec. 26, 2007 and Japanese Patent Application No. 2008-230881 filed on Sep. 9, 2008, including the specifications, drawings and abstracts are incorporated herein by reference in their entirety.

BACKGROUND

The present invention relates to an automatic transmission.

Automatic transmissions have been widely used as a transmission that is mounted on a vehicle. The automatic transmission includes a multi-stage speed change mechanism that changes a power transmission path of a gear portion by a clutch and a brake and shifts rotation of an input shaft to a plurality of shift speeds to be transmitted to an output shaft. This multi-stage speed change mechanism is accommodated in a transmission case (see, for example, Japanese Patent Application Publication No. JP-A-2002-161950).

When a vehicle having an automatic transmission mounted thereon is stopped by depressing a brake pedal, a driving force source (e.g., an engine) is rotating while dragging a torque converter at an idling speed. Fuel is therefore excessively consumed, resulting in degradation in fuel consumption.

In view of the above problem, automatic transmissions that perform neutral control while stopping a vehicle have been used in practical applications. According to the neutral control, when the brake pedal is depressed in the D range, an engagement state of a frictional engagement element which implements a first shift speed is appropriately controlled to establish a neutral state. When a driver depresses an accelerator pedal, a clutch is engaged to start the vehicle. This prevents degradation in fuel consumption.

SUMMARY

Of the above automatic transmissions, however, in an automatic transmission that is mounted on an FR (front engine, rear drive) automobile, a shock is generated after stopping the vehicle or upon starting the vehicle due to poor slidability of a spline formed on an output shaft. Such a shock is generated because the spline formed on the output shaft of the automatic transmission and a propeller shaft fixed to the vehicle get stuck on each other in a fitting portion between the spline and the propeller shaft when the vehicle is stopped.

Figure 7:
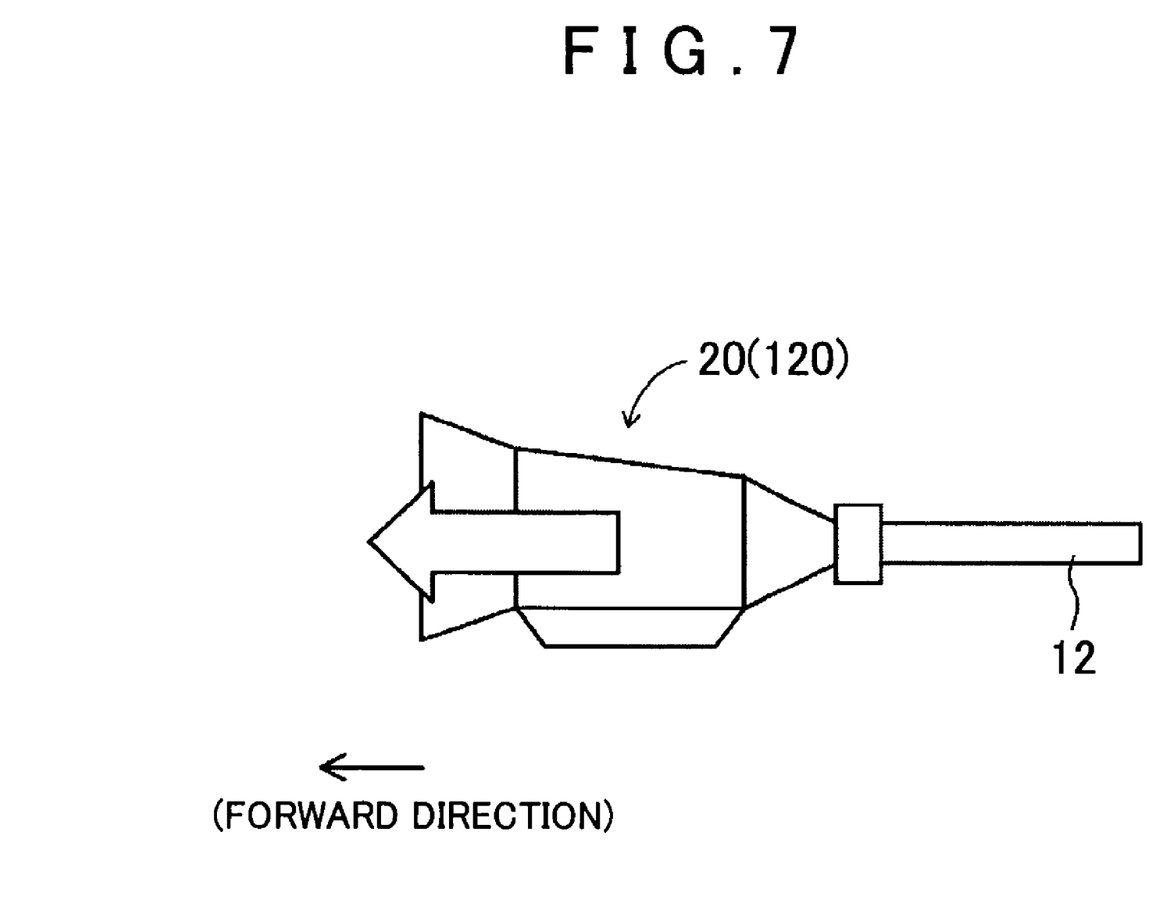
FIG. 7 is a diagram illustrating a state of the automatic transmission and a propeller shaft when the vehicle is stopped.

More specifically, when a vehicle is stopped by depressing a brake pedal, the engine and the automatic transmission, which are supported by the vehicle with a rubber mount, move in a forward direction of the vehicle according to the law of inertia (see FIG. 7). Since the shift position is in the D range at this time, a torque has been transmitted from the automatic transmission to the propeller shaft. Therefore, the automatic transmission that has moved in the forward direction of the vehicle will not return to a normal position due to a rough engagement between the output shaft of the automatic transmission and the propeller shaft. When a neutral control is performed or the vehicle is restarted thereafter, rough engagement between the output shaft of the automatic transmission and the propeller shaft is eliminated, and the automatic transmission returns to the normal position. A large shock is generated at this time (see FIG. 8). Especially when neutral control is performed, the automatic transmission returns to the normal position while the vehicle is stopped. Therefore, a greater shock than that in start-up is felt.

Such a shock can be reduced by improving slidability in the fitting portion between the spline formed on the output shaft of the automatic transmission and a power transmission shaft (propeller shaft) fixed to the vehicle. With improved slidability, the output shaft and the power transmission shaft (propeller shaft) slide with respect to each other without rough engagement even if the automatic transmission moves in the forward direction of the vehicle when the vehicle is stopped. Therefore, the automatic transmission immediately returns to the proper position, whereby a shock is reduced (or is hardly generated). Slidability between the spline of the output shaft and the power transmission shaft (propeller shaft) can be improved by performing surface treatment (e.g., a lubrite process) on the spline portion of the output shaft. However, an additional line for surface treatment is required to perform such surface treatment, which is disadvantageous in terms of cost. In other words, performing such surface treatment results in an expensive automatic transmission (increases the product cost).

The present invention is made to solve the above problems and it is an object of the present invention to provide an automatic transmission capable of reducing a shock that is generated by a movement of the automatic transmission after a vehicle is stopped, while suppressing an increase in product cost. The present invention can also achieve various other advantages.

According to an exemplary aspect of the invention, an automatic transmission includes an input shaft; an output shaft; and a speed change mechanism portion that shifts a rotation of the input shaft to be transmitted to the output shaft, wherein: the output shaft has a spline formed in a range in which the output shaft fits in a power transmission shaft included in a vehicle, and n-stage (n is an integer of at least 2) chamfering is performed on a larger diameter portion of the spline.

According to an exemplary aspect of the invention, an automatic transmission includes an input shaft; an output shaft; and a speed change mechanism portion that shifts a rotation of the input shaft to be transmitted to the output shaft, wherein: the output shaft has a spline formed in a range in which the output shaft fits in a power transmission shaft included in a vehicle, a first stage chamfering is performed on a larger diameter portion of the spline with a first stage chamfer angle in a range of approximately 15 to 45 degrees, and a second stage chamfering is performed on the larger diameter portion of the spline with a second stage chamfer angle set to approximately half of the first stage chamfer angle.

BRIEF DESCRIPTION OF THE DRAWINGS

Various exemplary aspects of the invention will be described with reference to the drawings wherein.

DETAILED DESCRIPTION OF EMBODIMENTS

Hereinafter, an embodiment of an automatic transmission of the present invention will be described in detail with reference to the accompanying drawings. The embodiment is a longitudinally mounted automatic transmission that is mounted on a front engine, rear drive (FR) automobile for performing a so-called neutral control. The automatic transmission according to the embodiment will be described with reference to FIGS. 1 and 2.

Figure 1:
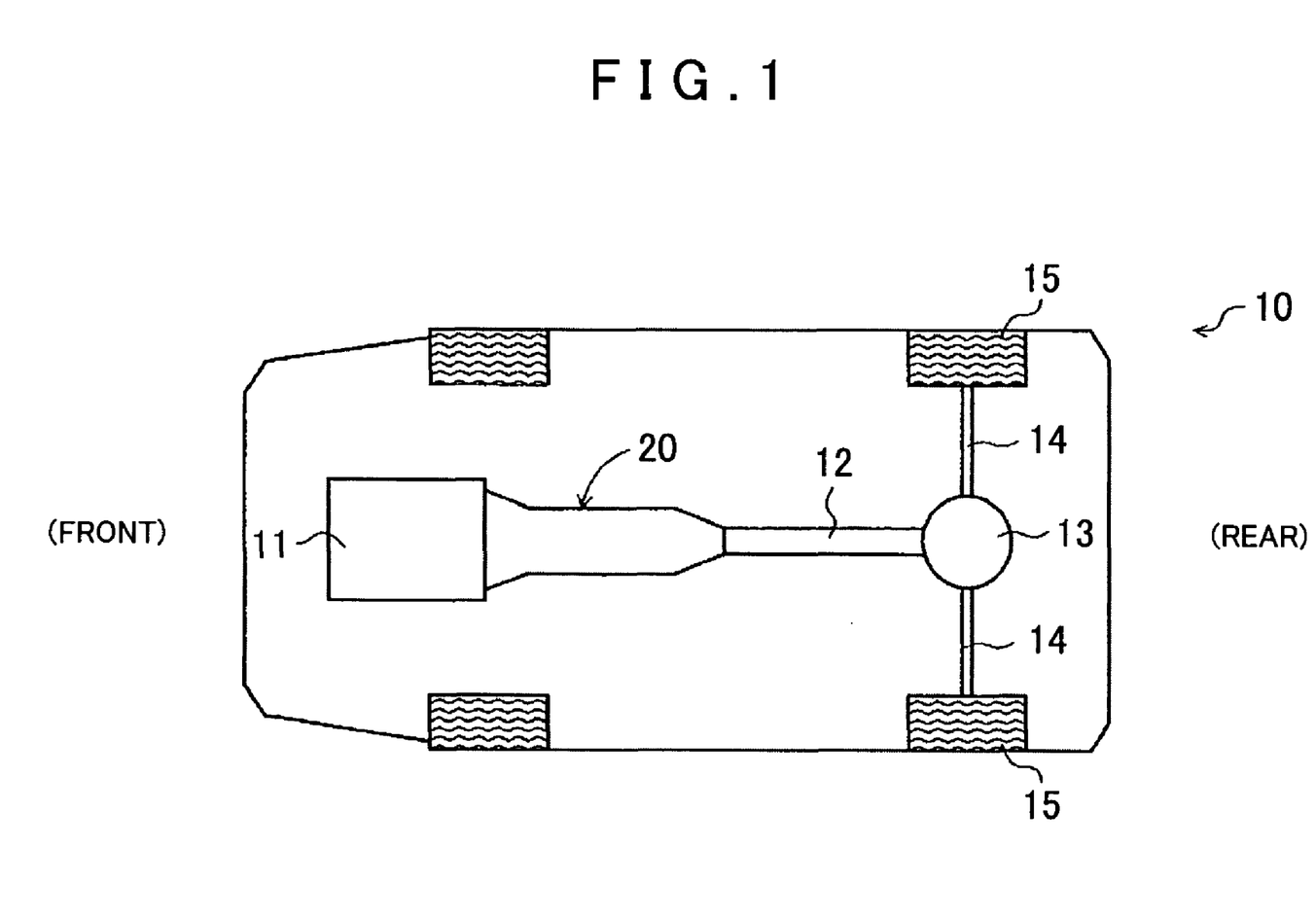
FIG. 1 is a diagram schematically showing a state in which an automatic transmission according to an embodiment is mounted on a vehicle.
Figure 2:
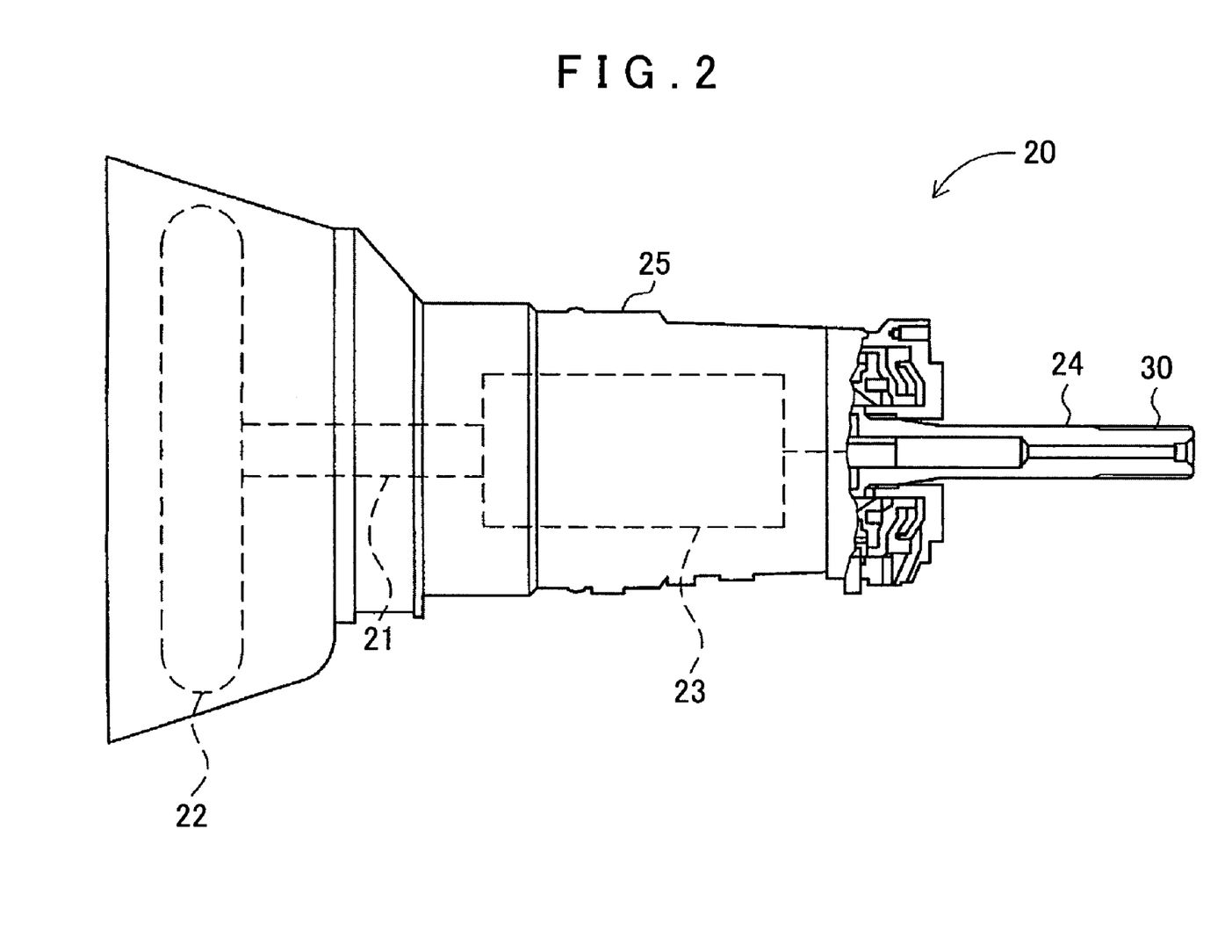
FIG. 2 is a diagram schematically showing a structure of the automatic transmission according to the embodiment.

FIG. 1 is a diagram schematically showing a state in which the automatic transmission according to the embodiment is mounted on a vehicle. FIG. 2 is a diagram schematically showing a structure of the automatic transmission according to the embodiment.

As shown in FIG. 1, an automatic transmission 20 according to the embodiment is mounted rearward of an engine 11 of an automobile 10. More specifically, the automatic transmission 20 is provided in a floor tunnel formed in the automobile 10, and mounted on the automobile 10 through a rubber mount. Note that the engine 11 is also mounted on the automobile 10 through the rubber mount. A front side of the automatic transmission 20 is fixed to a rear end of the engine 11. On the other hand, a rear side of the automatic transmission 20 is connected to a propeller shaft 12 serving as a power transmission shaft. The automatic transmission 20 is thus mounted between the engine 11 and the propeller shaft 12.

The other end of the propeller shaft 12 is connected to a differential device 13 mounted (fixed) on the automobile 10. As known in the art, the differential device 13 has a plurality of pinion gears, side gears meshing with the plurality of pinion gears, and a final ring gear connected to the plurality of pinion gears. Drive shafts 14, 14 respectively connected to rear wheels 15, 15 are connected to the side gears of the differential device 13.

As shown in FIG. 2, the automatic transmission 20 includes an input shaft 21, a torque converter 22, a speed change mechanism portion 23, and an output shaft 24. These structural elements are accommodated in a transaxle case 25. The automatic transmission 20 has a neutral control mechanism for establishing a neutral state by disengaging a forward clutch when a driver depresses a brake pedal and stops the automobile 10 in the D range and for starting the automobile 10 by engaging the clutch when the driver depresses an accelerator pedal. This eliminates the need for the driver to switch the shift position from D range to N range every time the automobile 10 is stopped, and prevents the drag of the torque converter 22 from occurring during stopping of the automobile 10 without requiring such a shift operation of the driver, resulting in an improvement in fuel consumption.

As known in the art, the torque converter 22 has three impellers: a turbine runner, a pump impeller, and a stator. The pump impeller is connected to a crankshaft of the engine 11. When the pump impeller of the torque converter 22 is rotated by a rotation of the crankshaft of the engine 11, oil in the torque converter 22 is stirred and power is transmitted to the turbine runner, whereby the turbine runner is rotated. The power is transmitted to the input shaft 21 by the rotation of the turbine runner and is input to the speed change mechanism portion 23.

As known in the art, the speed change mechanism 23 includes a plurality of gears, a plurality of clutches and brakes, and the like. The speed change mechanism 23 performs shifting to a predetermined shift speed by changing an engagement/disengagement combination pattern of the plurality of clutches and brakes by hydraulic control. The rotation speed of the input shaft 21 is thus shifted and then transmitted to the output shaft 24.

Figure 3:
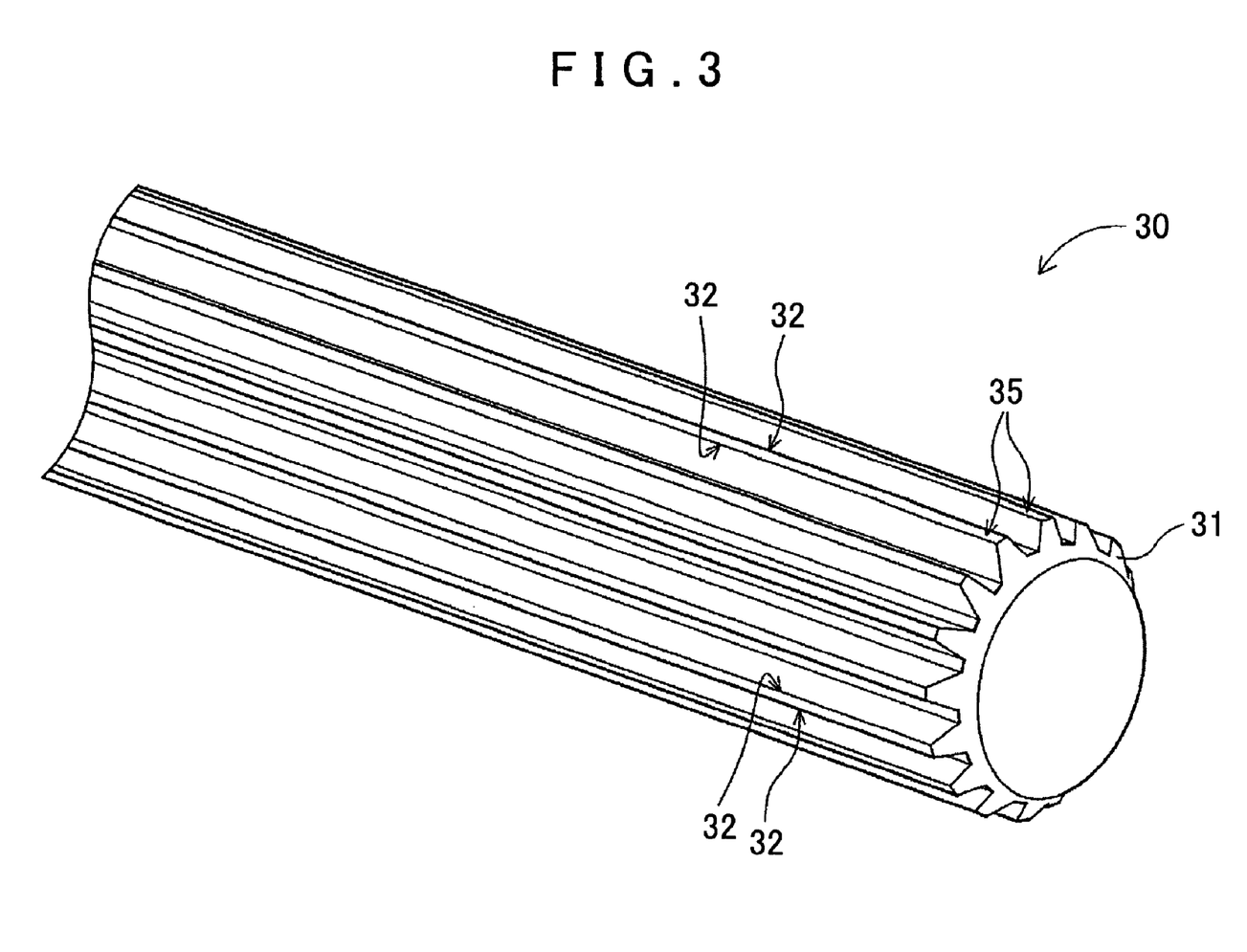
FIG. 3 is a perspective view showing a schematic structure of a spline formation portion.

The output shaft 24 is fittingly connected to the propeller shaft 12. As shown in FIGS. 2 and 3, the output shaft 24 has a spline 30 formed in the portion that fits in the propeller shaft 12. Note that FIG. 3 is a perspective view showing a schematic structure of a spline formation portion. A yoke (not shown) of the propeller shaft 12 fits on the spline 30, whereby the output shaft 24 and the propeller shaft 12 are connected to each other.

Figure 4:
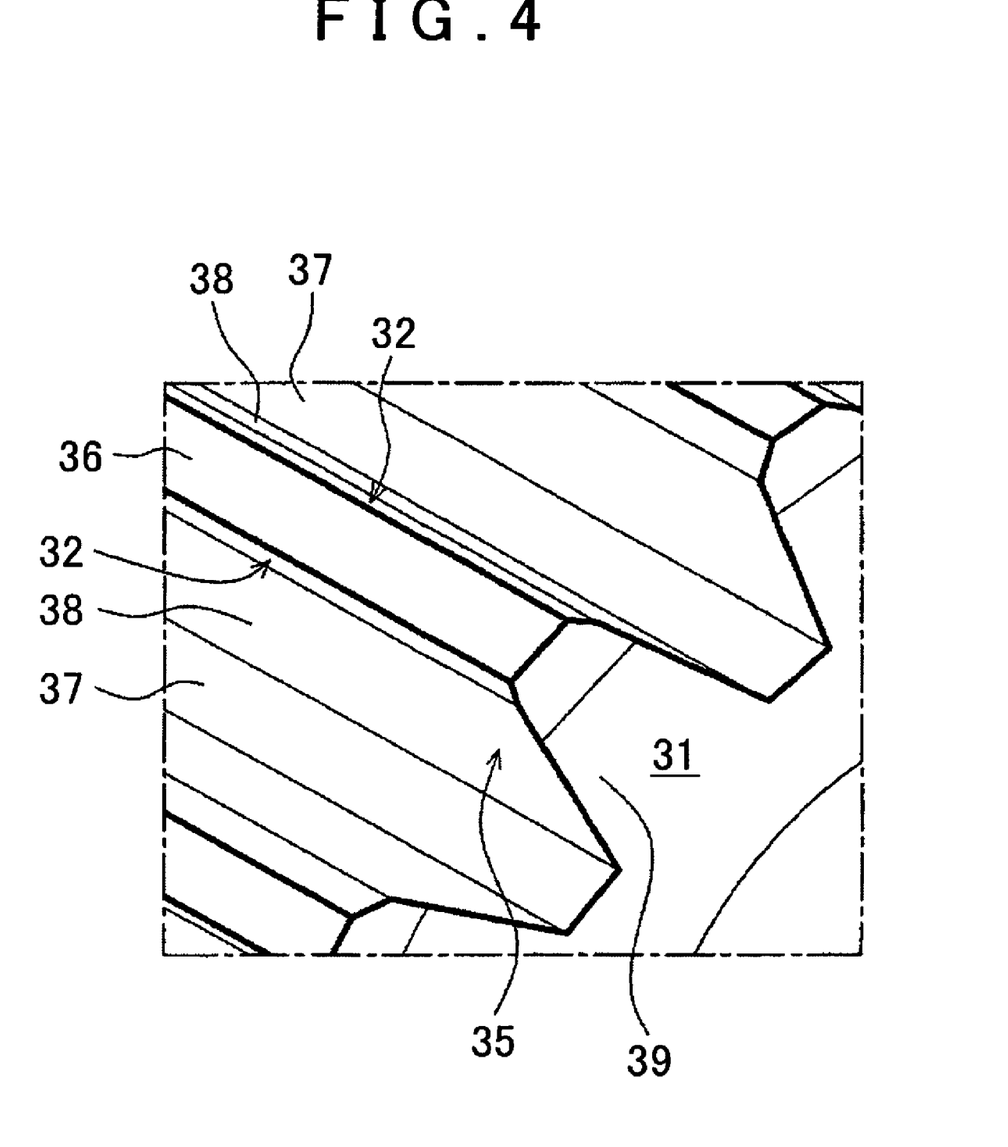
FIG. 4 is an enlarged perspective view showing a part of a spline tip portion.
Figure 5:
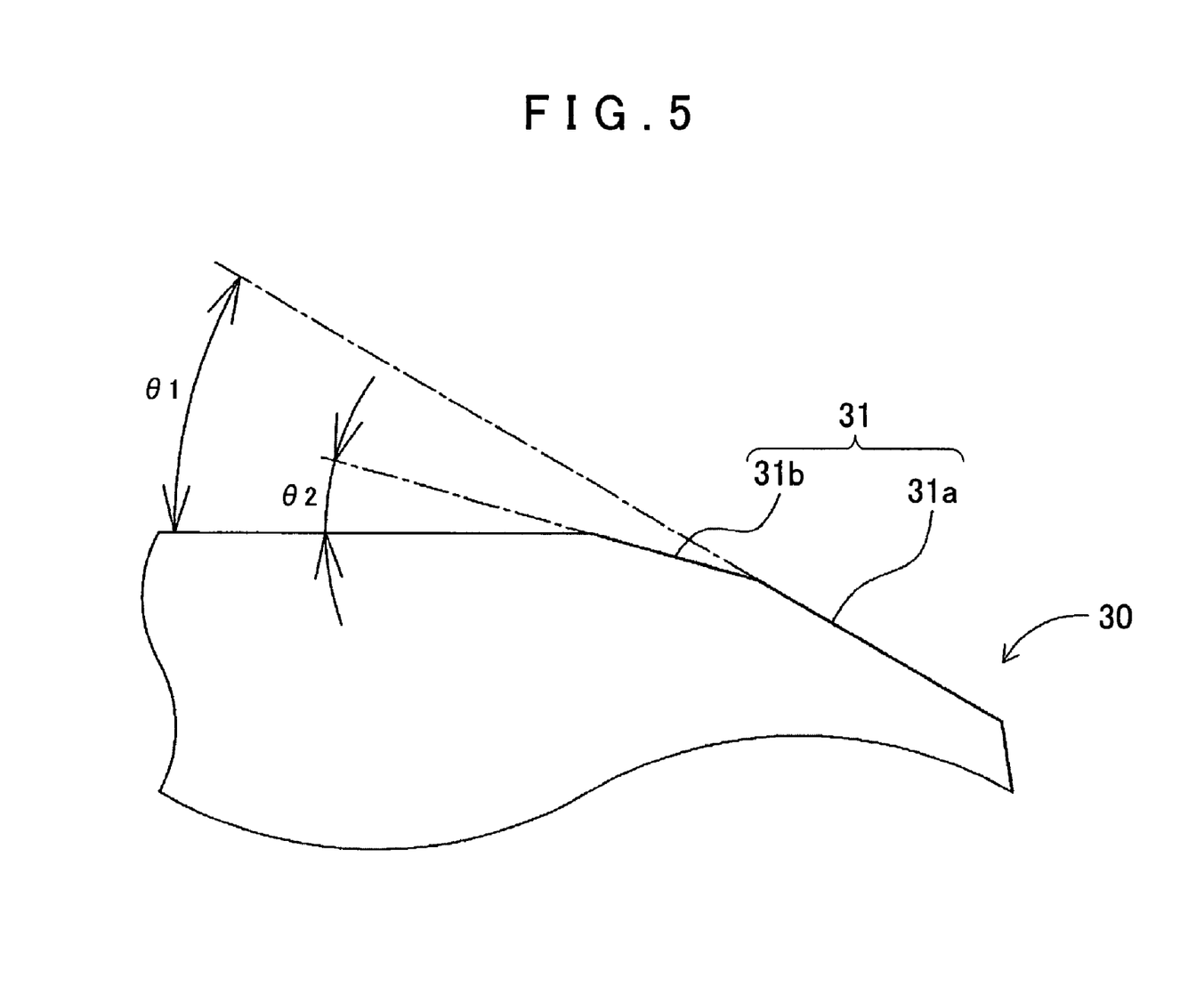
FIG. 5 is a diagram showing a larger diameter portion of a spline.
Figure 6:
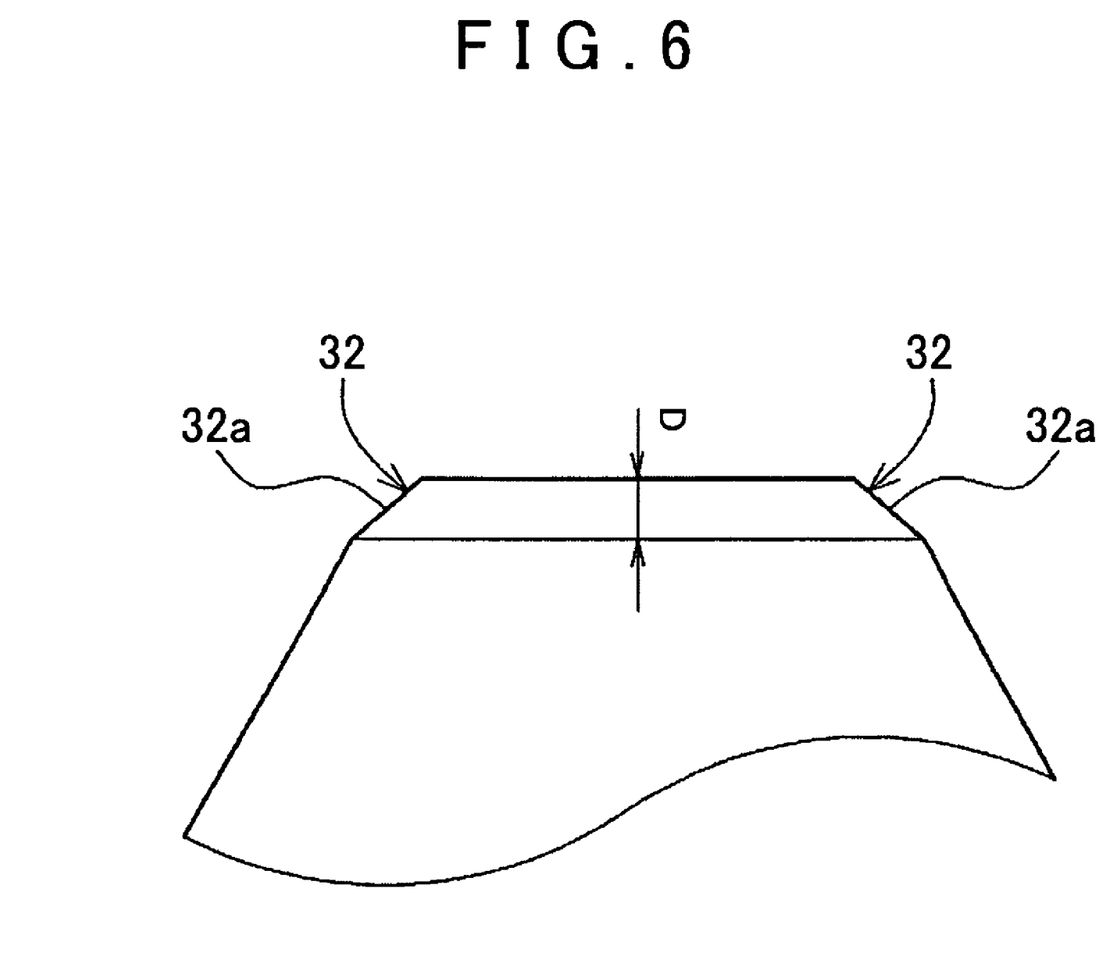
FIG. 6 is an enlarged view showing a tip of a spline tooth.

The spline 30 has a plurality of spline teeth 35. As shown in FIG. 4, a larger diameter surface 36 is formed at the tip of each spline tooth 35 and a smaller diameter surface (bottom surface of each spline groove) 37 is formed at the root of each spline tooth 35. A tooth flank 38 is formed between the larger diameter surface 36 and the smaller diameter surface 37. A larger diameter portion 31 and both ends 32, 32 of each tooth tip of the spline 30 are chamfered. The larger diameter portion 31 is a tip surface 39 of the spline teeth 35 of the spline 30 (output shaft 24). Note that FIG. 4 is an enlarged perspective view showing a part of a spline tip portion. The chamfering process will now be described in detail with reference to FIGS. 5 and 6. FIG. 5 is a diagram showing the larger diameter portion of the spline. FIG. 6 is an enlarged view showing a tip of a spline tooth.

As shown in FIG. 5, two-stage chamfering is performed on the larger diameter portion 31 of the spline 30 (which corresponds to n=2 in the claims). More specifically, first stage chamfering and second stage chamfering are performed sequentially from the tip side of the spline 30. Thus, the larger diameter portion 31 of the spline 30 has a first-stage chamfered portion 31a and a second-stage chamfered portion 31b formed in this order from the tip side of the spline 30. A chamfer angle θ1 of the first-stage chamfered portion 31a is set in the range of θ1=approximately 15° to 45°. Such setting of the chamfer angle θ1 improves the tooth contact of the tip portion of the spline 30 with the yoke of the propeller shaft 12 in each of the first and second stage chamferings. In other words, if the chamfer angel θ1 of the first stage chamfering is less than approximately 15°, a chamfer angle θ2 of the second stage chamfering becomes so small that the chamfering effect of the second stage chamfering cannot be obtained. If the first-stage chamfer angle θ1 is more than approximately 45°, on the other hand, the chamfering effect of the first stage chamfering cannot be obtained. Accordingly, the tooth contact of the tip portion of the spline 30 can be reliably improved by forming the first-stage chamfered portion 31a and the second-stage chamfered portion 31b by two-stage chamfering at the chamfer angle θ1 of the first-stage chamfered portion 31a in the range of θ1=approximately 15° to 45°. As a result, slidability between the tip portion of the spline 30 and the yoke of the propeller shaft 12 can be improved.

The chamfer angle θ2 of the second-stage chamfered portion 31b is set to approximately half of the chamfer angle θ1 of the first-stage chamfered portion 31a. The second-stage chamfer angle θ2 can be set only to a value smaller than the first-stage chamfer angle θ1. The inventors performed experiments with various second-stage chamfer angles θ2 and found that the tooth contact of the tip portion of the spline 30 with the yoke of the propeller shaft 12 is most improved when the second-stage chamfer angle θ2 is set to about ½ of the first-stage chamfer angle θ1. Note that, in the present embodiment, the first-stage chamfer angle θ1 is set to θ1=approximately 30° and the second-stage chamfer angle θ2 is set to θ2=approximately 15°.

As shown in FIG. 6, the tooth tip ends 32, 32 of the spline 30, on the other hand, are chamfered at a chamfer depth D to form C-chamfered portions 32a, 32a. This improves the tooth contact of the tooth tips of the spline 30 with the yoke of the propeller shaft 12. As a result, slidability between the spline 30 and the yoke of the propeller shaft 12 can be improved. The chamfering of the tooth tip ends 32, 32 of the spline 30 is preferably performed in the entire region of the spline 30 along an axial direction. This improves the tooth contact of the tooth tips of the spline 30 with the yoke of the propeller shaft 12 in the entire region of the spline 30 on the output shaft 24, whereby slidability between the spline 30 and the yoke of the propeller shaft 12 can further be improved.

The chamfer depth D of the C-chamfering is set in the range of D=approximately 0.1 to 0.3 mm. If the chamfer depth D is less than approximately 0.1 mm, the tooth contact of the tooth tips of the spline 30 with the yoke of the propeller shaft 12 is not improved. On the other hand, the chamfer depth D of more than approximately 0.3 mm increases looseness between the spline 30 and the yoke of the propeller shaft 12. The tooth contact of the tooth tips of the spline 30 with the yoke of the propeller shaft 12 can be reliably improved by forming the C-chamfered portions 32a, 32a at the tooth tip ends 32, 32 of the spline 30 by the C-chamfering at such a chamfer depth. Note that, in the present embodiment, the chamfer depth D is set to D=approximately 0.15 mm.

Note that the two-stage chamfering of the larger diameter portion 31 of the spline 30 and the C-chamfering of the tooth tip ends 32, 32, that is, forming the first-stage chamfered portion 31a and the second-stage chamfered portion 31b in the larger diameter portion 31 and forming the C-chamfered portions 32a, 32a at the tooth tip ends 32, 32, can be implemented by merely changing a cutter for forming the spline 30. Since a new line need not be provided, an increase in product cost can be significantly suppressed as compared to the case where a surface treatment is performed on the spline 30.

Functions of the automatic transmission 20 structured as described above will now be described. In the automobile 10, a driving force generated by the engine 11 is input to the automatic transmission 20 through the torque converter 22. As a result, the input shaft 21 of the automatic transmission 20 is rotated. The speed change mechanism portion 23 of the automatic transmission 20 performs shifting to a predetermined shift speed by changing an engagement/disengagement combination pattern of the plurality of clutches and brakes by hydraulic control. The rotation speed of the input shaft 21 is thus shifted and then transmitted to the output shaft 24. The driving force is thus transmitted to the propeller shaft 12 connected to the output shaft 24. The driving force thus transmitted is distributed to the drive shafts 14, 14 by the differential device 13, whereby the rear wheels 15, 15 are rotated.

Figure 8:
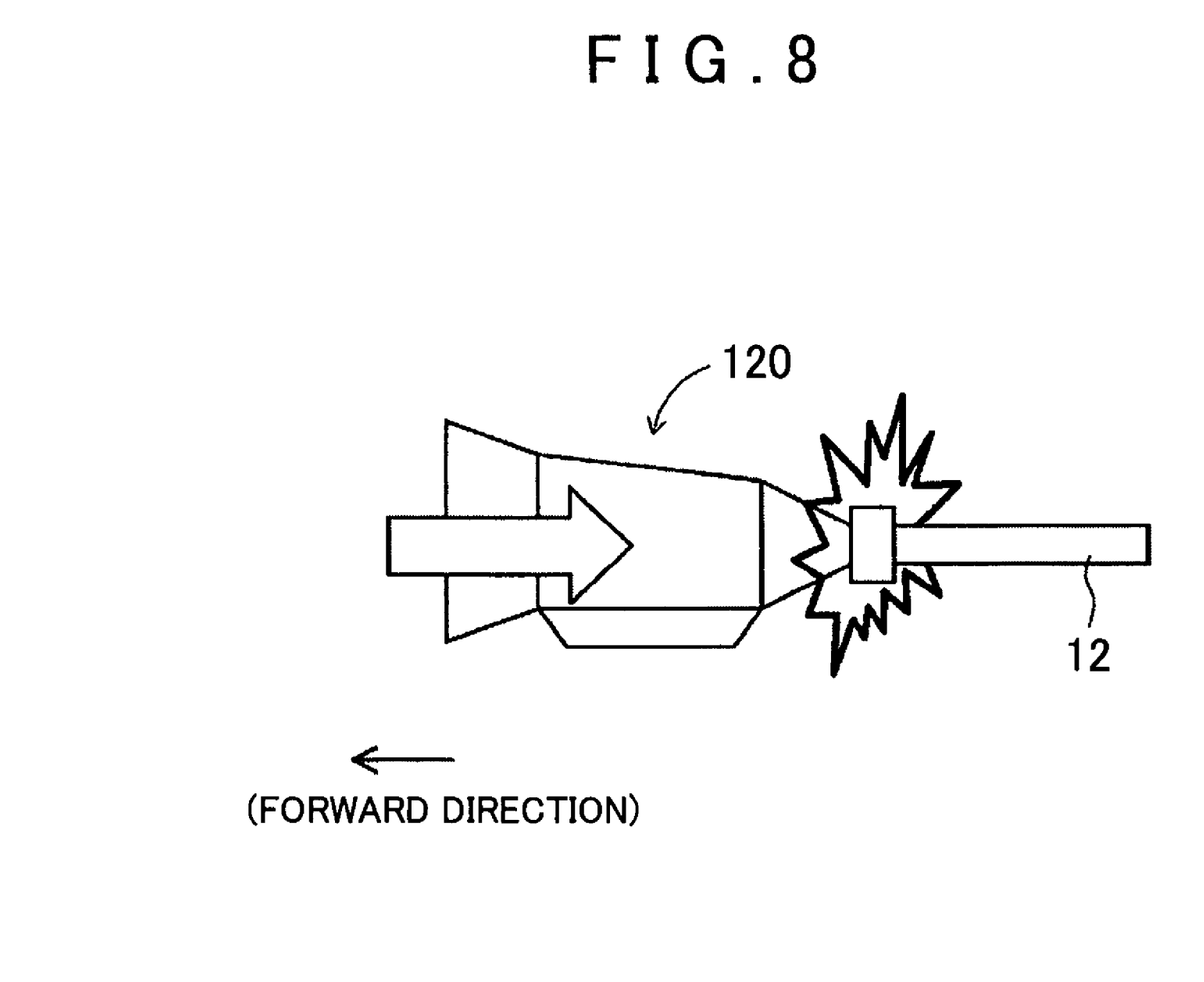
FIG. 8 is a diagram illustrating a state of a known automatic transmission (which has been neither subjected to surface treatment nor chamfering) and a propeller shaft when neutral control is performed.
Figure 9:
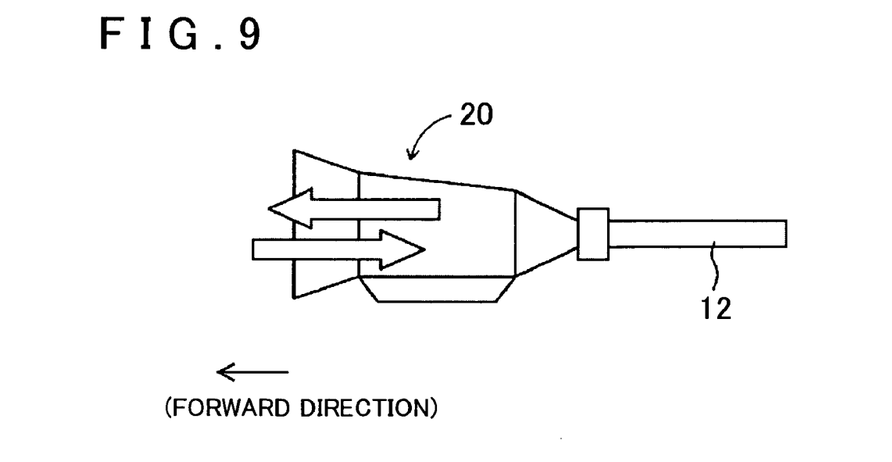
FIG. 9 is a diagram illustrating a state of the automatic transmission of the present embodiment and the propeller shaft when neutral control is performed.

When the automobile 10 is stopped, the automatic transmission 20 performs neutral control if conditions are satisfied. More specifically, the automatic transmission 20 disengages the forward clutch when the brake pedal is depressed in the D range. Behaviors of the automatic transmission 20 at this time will be described with reference to FIGS. 7 through 9. FIG. 7 is a diagram illustrating a state of the automatic transmission and the propeller shaft when the automobile is stopped. FIG. 8 is a diagram illustrating a state of a known automatic transmission (which has been neither subjected to surface treatment nor chamfering) and a propeller shaft when neutral control is performed. FIG. 9 is a diagram illustrating a state of the automatic transmission of the present embodiment and the propeller shaft when neutral control is performed.

First, when the brake pedal is depressed and the automobile 10 is stopped, the engine 11 and the automatic transmission 20 which are mounted on the vehicle through the rubber mount move in a forward direction of the vehicle by the law of inertia. Since the shift position is in D range at this time, a torque has been transmitted from the output shaft 24 of the automatic transmission 20 to the propeller shaft 12. Note that the propeller shaft 12 does not move because one end of the propeller shaft 12 is connected to the differential device 13 fixed to the vehicle.

If, as in a known automatic transmission 120 that has been neither subjected to surface treatment nor chamfering, slidability between an output shaft of the automatic transmission 120 and a propeller shaft 12 on the vehicle side is poor, the automatic transmission 120 that has moved in the forward direction of the vehicle will not return to a normal position as shown in FIG. 7 due to rough engagement between the output shaft of the automatic transmission 120 and the propeller shaft 12. The torque transmission from the output shaft to the propeller shaft 12 is stopped when neutral control is performed thereafter. As a result, rough engagement between the output shaft of the automatic transmission 120 and the propeller shaft 12 is eliminated, and the automatic transmission 120 returns to the normal position as shown in FIG. 8. A large shock is generated at this time. Even in an automatic transmission that does not perform neutral control, such a shock is generated when the vehicle is started.

In view of the above problem, the spline 30 of the output shaft 24 is chamfered in the automatic transmission 20 of the present embodiment. In other words, the two-stage chamfering is performed on the larger diameter portion 31 and the C-chamfering is performed on the tooth tip ends 32, 32. Therefore, excellent slidability is obtained between the spline 30 of the output shaft 24 and the propeller shaft 12. Accordingly, even if the engine 11 and the automatic transmission 20 move in the forward direction of the vehicle upon stopping of the automobile 10, rough engagement does not occur between the output shaft 24 of the automatic transmission 20 and the propeller shaft 12. Therefore, as shown in FIG. 9, the automatic transmission 20 returns to the normal position as soon as the inertial force generated upon stopping the automobile 10 disappears. Thus, a shock that is generated by a movement of the automatic transmission 20 is reduced.

Figure 10:
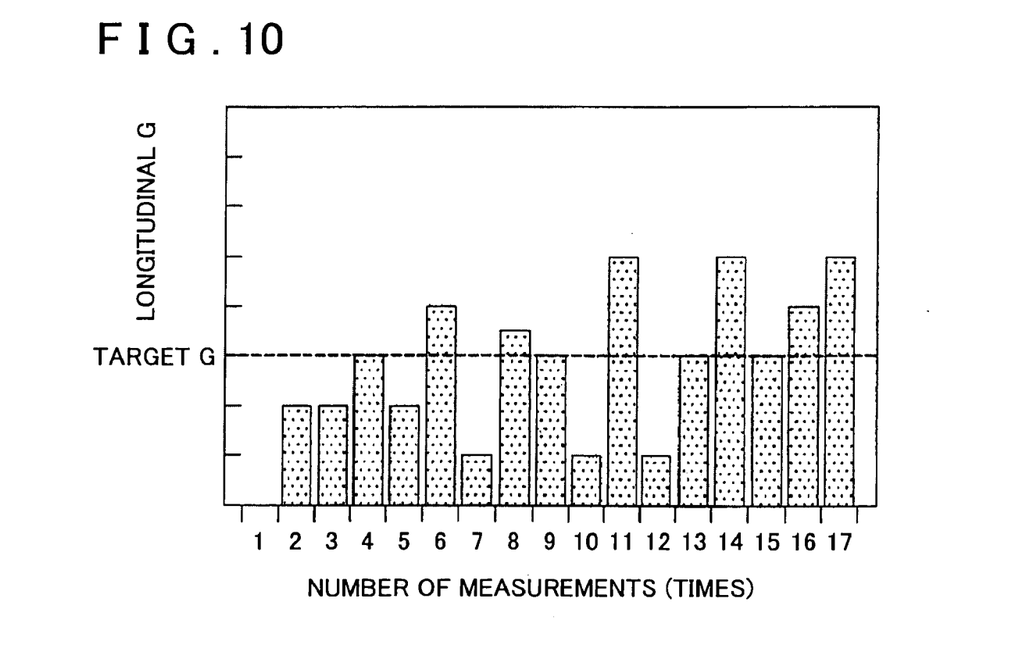
FIG. 10 is a diagram showing longitudinal G in the known automatic transmission (which has been neither subjected to surface treatment nor chamfering)
Figure 11:
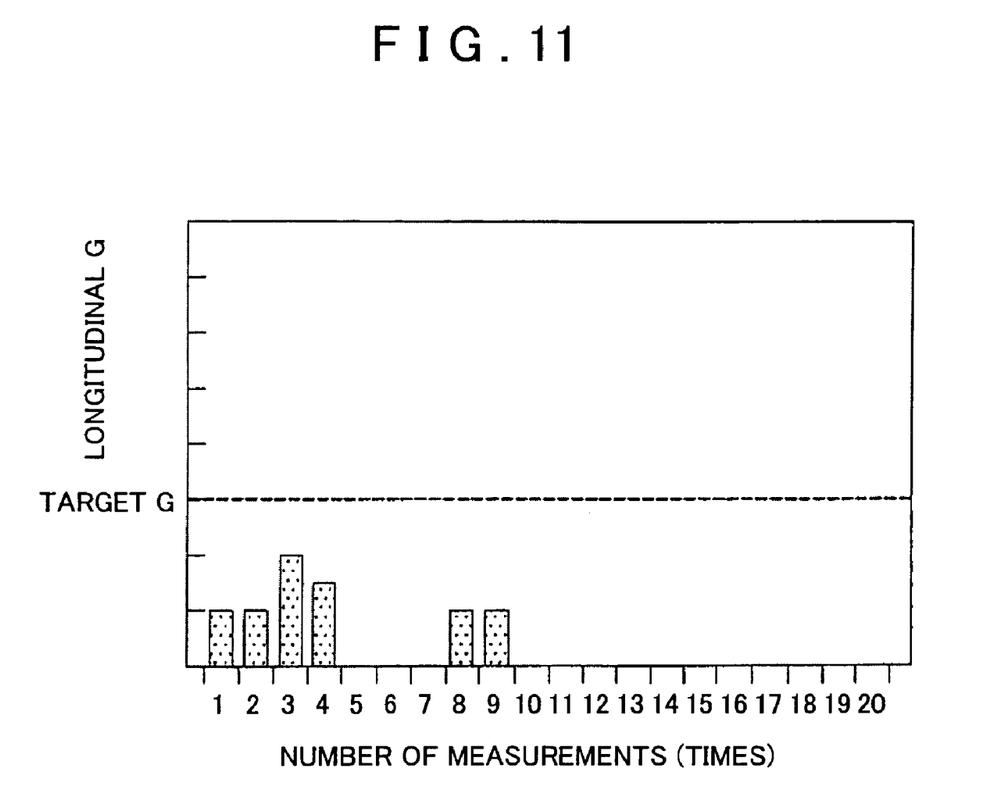
FIG. 11 is a diagram showing longitudinal G in the automatic transmission according to the embodiment.

In order to confirm reduction of the shock, longitudinal G of the automatic transmission was examined in an actual vehicle having the automatic transmission and the propeller shaft mounted on the same phase as when the shock is generated. The result is shown in FIGS. 10 and 11. FIG. 10 is a diagram showing the longitudinal G in the known automatic transmission (which has been neither subjected to surface treatment nor chamfering). FIG. 11 is a diagram showing the longitudinal G in the automatic transmission of the present embodiment.

As can be seen from FIG. 10, in the known automatic transmission, the longitudinal G exceeded the target G in about every one out of five measurements. Note that the target G is such a longitudinal G that a person in the automobile cannot feel a shock generated by movement of the automatic transmission. As can be seen from FIG. 11, on the other hand, the longitudinal G did not exceed the target G in the automatic transmission 20 of the present embodiment. As can be seen from the comparison between FIGS. 10 and 11, the frequency (rate) at which the longitudinal G is generated is lower in the automatic transmission 20 (FIG. 11) than in the known automatic transmission (FIG. 10). Moreover, the magnitude of the longitudinal G generated is smaller in the automatic transmission 20 than in the known automatic transmission. The result shows that a shock generated by movement of the automatic transmission 20 after the automobile 10 is stopped is reduced in the automatic transmission 20 of the present embodiment.

As has been described above in detail, in the automatic transmission 20 of the present embodiment, the two-stage chamfering is performed on the larger diameter portion 31 of the spline 30 of the output shaft 24 to form the first-stage chamfered portion 31a and the second-stage chamfered portion 31b in the larger diameter portion 31. Moreover, the C-chamfering is performed on the tooth tip ends 32, 32 to form the C-chamfered portions 32a, 32a at the tooth tip ends 32, 32. This improves the tooth contact of the spline 30 of the output shaft 24 with the yoke of the propeller shaft 12 and thus improves slidability between the output shaft 24 and the propeller shaft 12 in the automatic transmission 20. As a result, when the automatic transmission 20 moves in the forward direction of the vehicle upon stopping the vehicle, the spline 30 of the output shaft 24 is prevented from getting stuck and roughly engaged with the propeller shaft 12. As a result, even when the automatic transmission 20 moves in the forward direction of the vehicle upon stopping the vehicle, the output shaft 24 and the propeller shaft 12 slide with respect to each other without rough engagement, and the automatic transmission 20 immediately returns to the normal position. A shock that is generated by a movement of the automatic transmission 20 after stopping the vehicle can therefore be significantly reduced. Moreover, since the two-stage chamfering and the C-chamfering of the spline 30 of the output shaft 24 can be implemented by merely changing a cutter, a increase in product cost can be suppressed.

The above embodiment is shown by way of illustration only and does not limit the present invention in any way. It should be understood that various improvements and modifications can be made without departing from the gist of the present invention. For example, in the above embodiment, the present invention is applied to the automatic transmission 20 that performs neutral control. However, the present invention is also applicable to an automatic transmission that does not perform neutral control. In this case, a shock that is generated by movement of the automatic transmission when a vehicle is restarted after stopping can be reduced.

In the above embodiment, two-stage chamfering is performed on the larger diameter portion 31 of the spline 30 of the output shaft 24. However, three-stage or more chamfering may be performed. This can further reduce a shock that is generated by a movement of the automatic transmission after stopping of a vehicle.

In the above embodiment, the present invention is applied to a front engine, rear drive (FR) automobile. However, the present invention is also applicable to a midship engine, rear drive (MR) automobile having an automatic transmission longitudinally mounted thereon. In this case as well, the above effects can be obtained. The present invention is also applicable to a front engine, front drive (FF) automobile or a rear engine, rear drive (RR) automobile. In this case, a shock that is generated by movement of the automatic transmission after the automobile is stopped with a large lateral G applied thereto can be reduced.

According to an exemplary aspect of the invention, in this automatic transmission, the output shaft has the spline formed in the range in which the output shaft fits in the power transmission shaft included in the vehicle, and the n-stage (n is an integer of at least 2) chamfering, that is, a plurality of stages of chamfering, is performed on the larger diameter portion of the spline. This improves the tooth contact of the spline tip portion of the output shaft with the power transmission shaft, and thus improves slidability between the spline of the output shaft and the power transmission shaft. As a result, when the automatic transmission moves in the forward direction of the vehicle, the tip portion of the output shaft is prevented from getting stuck and roughly engaged with the power transmission shaft. As a result, even when the automatic transmission moves in the forward direction of the vehicle upon stopping the vehicle, the output shaft and the propeller shaft slide with respect to each other without rough engagement, and the automatic transmission immediately returns to the normal position. Therefore, a shock that is generated by a movement of the automatic transmission can be reduced.

The plurality of stages of chamfering can be performed on the larger diameter portion of the spline by merely changing a cutter. Unlike the case where surface treatment is performed on the spline portion, a new line is not necessary, whereby an increase in product cost can be suppressed. This automatic transmission can therefore reduce a shock that is generated by a movement of the automatic transmission after the vehicle is stopped, while suppressing an increase in product cost.

According to an exemplary aspect of the invention, performing chamfering on both ends of each tooth tip of the spline improves the tooth contact of the spline of the output shaft with the power transmission shaft, and thus improves slidability between the spline of the output shaft and the power transmission shaft.

Note that the chamfering of both ends of each tooth tip of the spline is preferably performed in the entire spline region along an axial direction of the output shaft. This improves the tooth contact of the spline with the power transmission shaft in the entire spline formation region of the output shaft, whereby slidability between the spline of the output shaft and the power transmission shaft can further be improved.

According to an exemplary aspect of the invention, performing such chamfering on the both ends of each tooth tip of the spline reliably improves the tooth contact of the spline of the output shaft with the power transmission shaft, and thus reliably improves slidability between the spline of the output shaft and the power transmission shaft. Moreover, the chamfer depth is set in the above range for the following reason: if the chamfer depth is less than approximately 0.1 mm, the tooth contact of the spline of the output shaft with the power transmission shaft is not improved. On the other hand, the chamfer depth of more than approximately 0.3 mm increases looseness between the spline and the power transmission shaft. In other words, by performing the C-chamfering on the both ends of each tooth tip of the spline at the chamfer depth of the above range, the tooth contact of the spline with the power transmission shaft can be reliably improved while preventing an increase in looseness between the spline and the power transmission shaft.

According to an exemplary aspect of the invention, performing such chamfering on the larger diameter portion of the spline reliably improves the tooth contact of the spline tip portion of the output shaft with the power transmission shaft, and thus reliably improves slidability between the spline of the output shaft and the power transmission shaft. Moreover, setting the $n^{th}$-stage chamfer angle to a value equal to approximately a half of the $(n-1)^{th}$ stage chamfer angle improves slidability between the spline of the output shaft and the power transmission shaft the most.

According to an exemplary aspect of the invention, if the $(n-1)^{th}$-stage chamfer angel is less than approximately 15 degrees, the $n^{th}$-stage chamfer angle becomes so small that the effect of the $n^{th}$-stage chamfering cannot be obtained and the effect of the n-stage (a plurality of stages) chamfering therefore cannot be obtained. If the $(n-1)^{th}$-stage chamfer angle is more than approximately 45 degrees, on the other hand, the effect of the $(n-1)^{th}$-stage chamfering cannot be obtained and the effect of the n-stage (a plurality of stages) chamfering therefore cannot be obtained. In other words, by setting the $(n-1)^{th}$-stage chamfer angel in the range of approximately 15 to 45 degrees, the effect of improving the tooth contact of the spline with the power transmission shaft in the spline tip portion of the output shaft can be obtained for each of the $n^{th}$-stage and $(n-1)^{th}$-stage (and $(n-3)^{th}$-stage, $(n-4)^{th}$-stage, . . . ) chamferings. As a result, a synergetic effect can be reliably obtained by the n-stage (a plurality of stages) chamfering.

According to an exemplary aspect of the invention, as described above, an automatic transmission that performs neutral control returns to the normal position while the vehicle is stopped. Therefore, a greater shock than that in start-up is felt. Such a shock can therefore be effectively reduced by applying the present invention to the automatic transmission that performs neutral control.

As described above, the automatic transmission according to the present invention can improve slidability between the spline of the output shaft and the power transmission shaft, and thus can reduce a shock that is generated by a movement of the automatic transmission after a vehicle is stopped, while suppressing an increase in product cost.

What is claimed is:

1. An automatic transmission comprising:
    an input shaft;
    an output shaft; and
    a speed change mechanism portion that shifts a rotation of the input shaft to be transmitted to the output shaft, wherein:
        the output shaft has a spline formed in a range in which the output shaft fits in a power transmission shaft included in a vehicle,
        the spline has a plurality of teeth with a groove formed between adjacent teeth,
        the teeth have an outer portion and an inner portion that is closer to the groove than the outer portion,
        n-stage chamfering is performed on the outer portion,
        n-stage chamfering is not performed on the inner portion, -and
        n is an integer of at least 2.

2. The automatic transmission according to claim 1, wherein:
    n-stage chamfering is performed on a tip surface of the teeth.

3. The automatic transmission according to claim 2, wherein chamfering is performed on both ends of each tooth tip of the spline.

4. The automatic transmission according to claim 3, wherein the chamfering that is performed on the both ends of each tooth tip of the spline is C-chamfering at a chamfer depth of approximately 0.1 to 0.3 mm.

5. The automatic transmission according to claim 4, wherein, in the n-stage chamfering that is performed on the outer portion of the teeth, an $n^{th}$-stage chamfer angle is approximately half of an $(n-1)^{th}$ stage chamfer angle.

6. The automatic transmission according to claim 5, wherein the $(n-1)^{th}$-stage chamfer angle is set in a range of 15 to 45 degrees.

7. The automatic transmission according to claim 6, wherein neutral control is performed when the vehicle is stopped.

8. The automatic transmission according to claim 4, wherein, in the n-stage chamfering that is performed on the outer portion of the teeth an $(n-1)^{th}$ stage chamfer angle is set in a range of approximately 15 to 45 degrees.

9. The automatic transmission according to claim 8, wherein an $n^{th}$-stage chamfer angle is less than the $(n-1)^{th}$ stage chamfer angle.

10. The automatic transmission according to claim 1, wherein neutral control is performed when the vehicle is stopped.

11. The automatic transmission according to claim 1, wherein:
    C-chamfering is performed on both ends of each tooth tip of the spline at a chamfer depth of approximately 0.15 mm, and
    in the n-stage chamfering that is performed on the outer portion of the teeth, an $n^{th}$-stage chamfer angle is approximately 15 degrees and an $(n-1)^{th}$ stage chamfer angle is approximately 30 degrees.

12. The automatic transmission according to claim 1, wherein, in the n-stage chamfering that is performed on the outer portion of the teeth, an $(n-1)^{th}$ stage chamfer angle is set in a range of approximately 15 to 45 degrees.

13. The automatic transmission according to claim 12, wherein an $n^{th}$-stage chamfer angle is less than the $(n-1)^{th}$ stage chamfer angle.

14. The automatic transmission according to claim 1, wherein, in the n-stage chamfering that is performed on the outer portion of the teeth, an $n^{th}$-stage chamfer angle is approximately half of an $(n-1)^{th}$ stage chamfer angle.

15. The automatic transmission according to claim 14, wherein the $(n-1)^{th}$-stage chamfer angle is set in a range of approximately 15 to 45 degrees.

16. The automatic transmission according to claim 1, wherein chamfering is performed on both ends of each tooth tip of the spline.

17. The automatic transmission according to claim 16, wherein the chamfering that is performed on the both ends of each tooth tip of the spline is C-chamfering at a chamfer depth of approximately 0.1 to 0.3 mm.

18. The automatic transmission according to claim 16, wherein the chamfering is performed in an entire region of the spline along an axial direction.

19. An automatic transmission comprising:
    an input shaft;
    an output shaft; and
    a speed change mechanism portion that shifts a rotation of the input shaft to be transmitted to the output shaft, wherein:
the output shaft has a spline formed in a range in which the output shaft fits in a power transmission shaft included in a vehicle,
a first stage chamfering is performed on a larger diameter portion of the spline with a first stage chamfer angle in a range of approximately 15 to 45 degrees, and
a second stage chamfering is performed on the larger diameter portion of the spline with a second stage chamfer angle set to approximately half of the first stage chamfer angle.

20. The automatic transmission according to claim 19, wherein chamfering is performed on both ends of each tooth tip of the spline.

21. The automatic transmission according to claim 20, wherein the chamfering that is performed on the both ends of each tooth tip of the spline is C-chamfering at a chamfer depth of approximately 0.1 to 0.3 mm.

* * * * *